(12) United States Patent
Link et al.

(10) Patent No.: US 9,399,886 B2
(45) Date of Patent: Jul. 26, 2016

(54) DOOR CLOSING MECHANISM

(71) Applicant: Precision Pet Products, Inc., Costa Mesa, CA (US)

(72) Inventors: David Link, Costa Mesa, CA (US); Hongkun Liang, Zhongshan (CN)

(73) Assignee: Precision Pet Products, Inc., Costa Mesa, CA (US)

( * ) Notice: Subject to any disclaimer, the term of this patent is extended or adjusted under 35 U.S.C. 154(b) by 0 days.

(21) Appl. No.: 14/700,900

(22) Filed: Apr. 30, 2015

(65) Prior Publication Data

US 2016/0060946 A1 Mar. 3, 2016

Related U.S. Application Data

(60) Provisional application No. 62/043,102, filed on Aug. 28, 2014.

(51) Int. Cl.

| A01K 1/03 | (2006.01) |
|---|---|
| E06B 3/52 | (2006.01) |
| E05D 15/56 | (2006.01) |
| E05D 1/02 | (2006.01) |
| E05D 1/04 | (2006.01) |
| E06B 5/00 | (2006.01) |
| E06B 3/70 | (2006.01) |

(52) U.S. Cl.
CPC . *E06B 3/52* (2013.01); *A01K 1/034* (2013.01); *E05D 1/02* (2013.01); *E05D 1/04* (2013.01); *E05D 15/56* (2013.01); *E06B 5/00* (2013.01); *E06B 2003/7046* (2013.01)

(58) Field of Classification Search
CPC ......... A01K 1/03; A01K 31/02; A01K 1/031; A01K 31/10; A01K 31/002; A01K 31/06; A01K 31/07; A01K 31/08; A01K 1/0017; A01K 1/033; A01K 1/034; A01K 1/032; A01K 1/0245; A01K 1/0035; E06B 3/52; E06B 2003/7046; E06B 11/023; E06B 11/02; E05D 15/56; E05D 1/02; E05D 1/04; E05D 1/06
USPC ......... 119/428–431, 452–456, 459, 461, 464, 119/474, 475, 481, 482, 487, 489–492, 494, 119/496–499, 501, 524; 49/236–239
See application file for complete search history.

(56) References Cited

U.S. PATENT DOCUMENTS

| 3,896,766 A | 7/1975 | Martin |
|---|---|---|
| 4,016,833 A | 4/1977 | Ray |
| 4,140,080 A | 2/1979 | Snader |
| 4,527,512 A | 7/1985 | Sugiura |
| 4,590,885 A | 5/1986 | Sugiura |
| 4,762,085 A | 8/1988 | Ondrasik |

(Continued)

OTHER PUBLICATIONS

Precision Pet Products, "Suitcase Crate", photo.

(Continued)

*Primary Examiner* — Trinh Nguyen
(74) *Attorney, Agent, or Firm* — Stetina Brunda Garred & Brucker

(57) ABSTRACT

A camming member for a door may have a camming surface which lifts the door as the door is traversed from an opened position to a closed position. The lifting movement of the door caused by the camming member facilitates one or more latches used to reinforce a periphery of the door to be engaged without further user intervention.

11 Claims, 13 Drawing Sheets

(56) References Cited

U.S. PATENT DOCUMENTS

| | | | |
|---|---|---|---|
| 4,763,606 A | 8/1988 | Ondrasik, II | |
| 4,917,047 A | 4/1990 | Wazeter, III | |
| 5,097,796 A | 3/1992 | Reimers | |
| 5,233,939 A | 8/1993 | Randolph | |
| 5,335,618 A | 8/1994 | Zarola | |
| 5,482,005 A | 1/1996 | Thom | |
| 5,544,619 A | 8/1996 | Braun | |
| 5,549,073 A | 8/1996 | Haskins et al. | |
| 5,626,098 A | 5/1997 | Haskins et al. | |
| 5,653,194 A | 8/1997 | Guy | |
| 5,752,470 A | 5/1998 | Koneke | |
| 5,950,568 A | 9/1999 | Axelrod et al. | |
| 5,967,089 A | 10/1999 | Allen | |
| 6,092,488 A | 7/2000 | Allawas | |
| 6,152,081 A | 11/2000 | Baker | |
| 6,155,206 A | 12/2000 | Godshaw | |
| 6,192,834 B1 | 2/2001 | Kolozvari | |
| 6,631,590 B1 | 10/2003 | Glowaski | |
| 6,681,720 B1 | 1/2004 | Skurdalsvold et al. | |
| 6,883,463 B2 | 4/2005 | Link | |
| 8,925,492 B2 | 1/2015 | Cantwell et al. | |

OTHER PUBLICATIONS

Photograph of Pet Enclosure, Mar. 11, 2004.
Photograph of Pet Enclosure, Jan. 12, 2006.
Photo of Pet Enclosure, published at least as early as 2007.
Precision Pet Products, Inc., Wire Crates, Exercise Pens and Accessories, published at least as early as 2007.

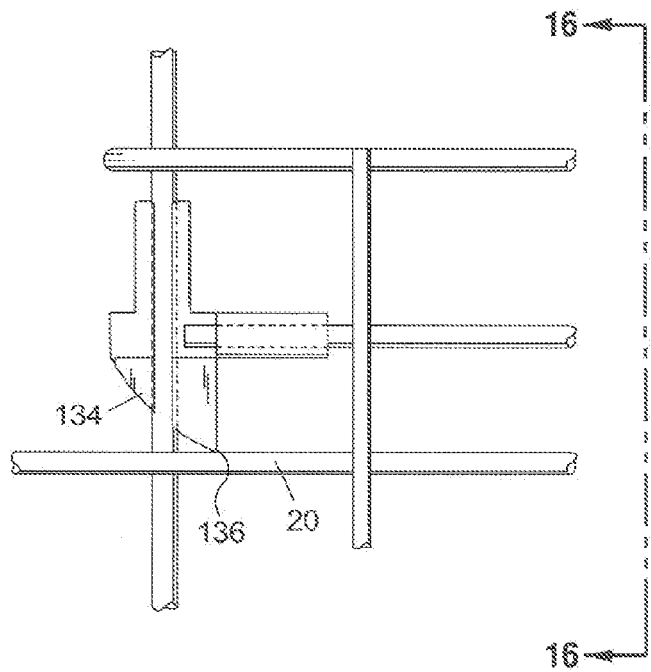 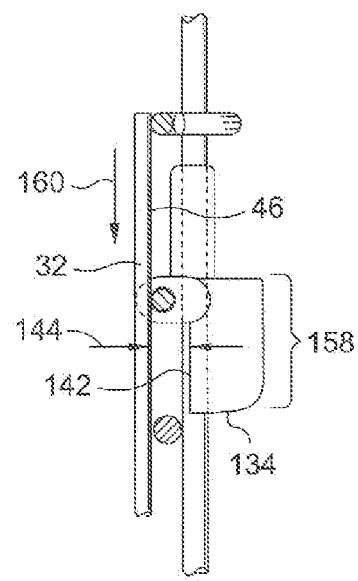
FIG. 15      FIG. 16
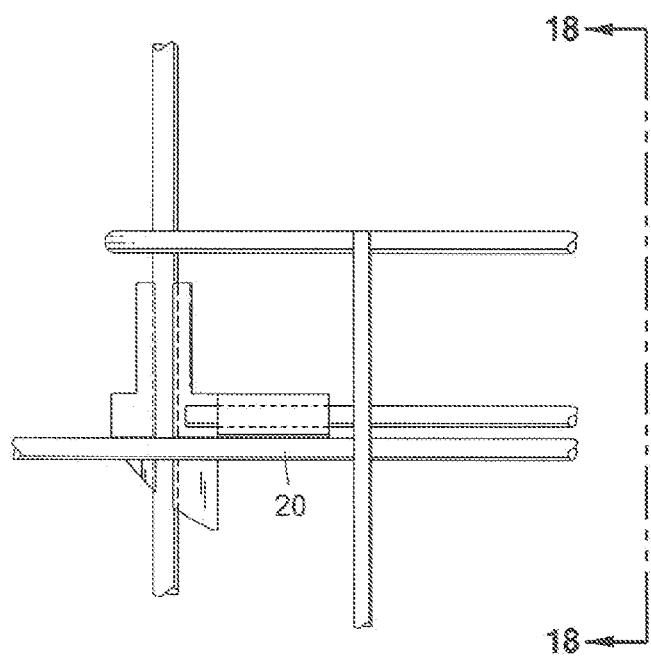 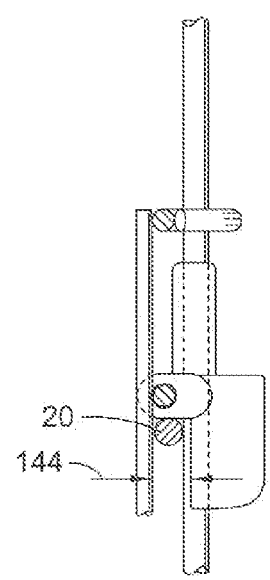
FIG. 17      FIG. 18

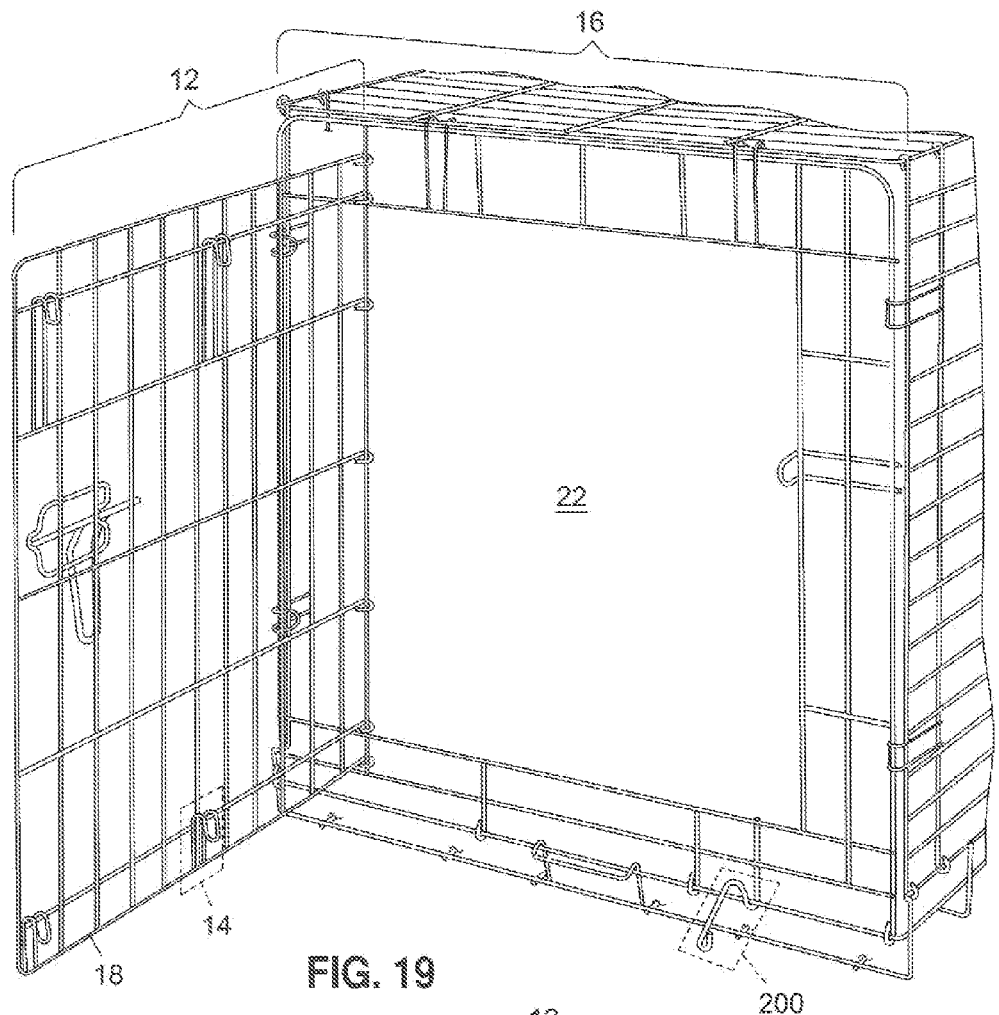
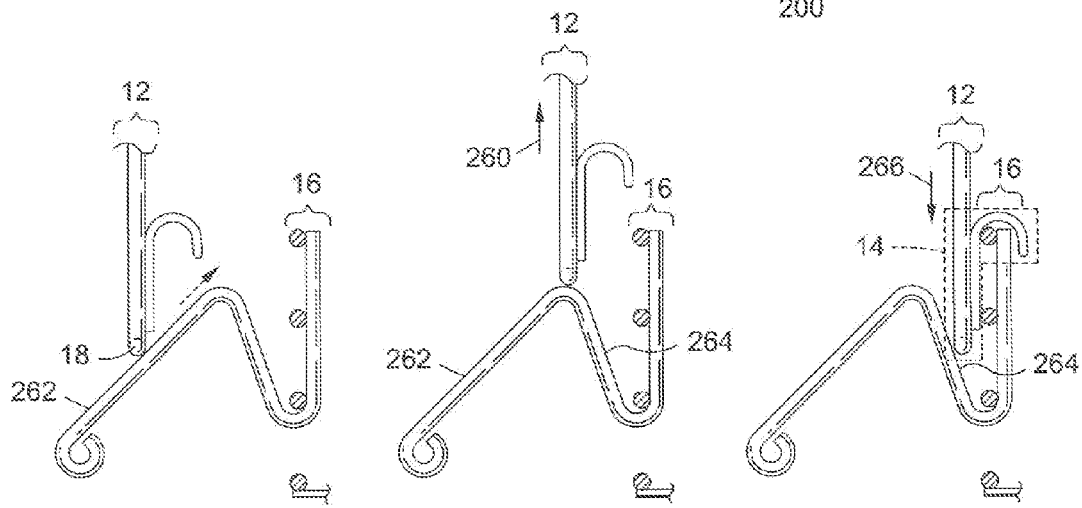
FIG. 19
FIG. 20  FIG. 21  FIG. 22

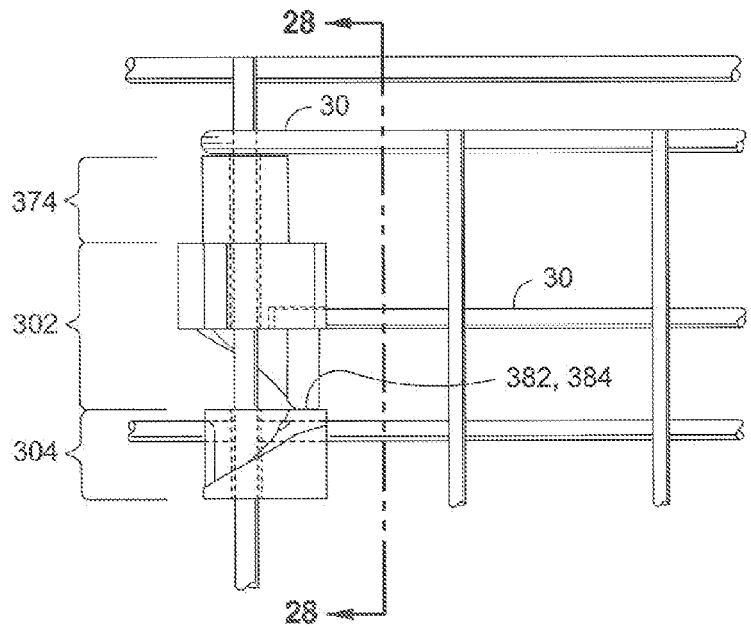
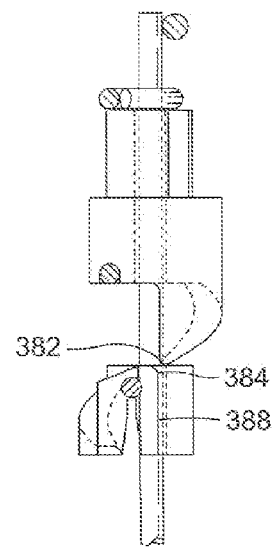
FIG. 27  FIG. 28
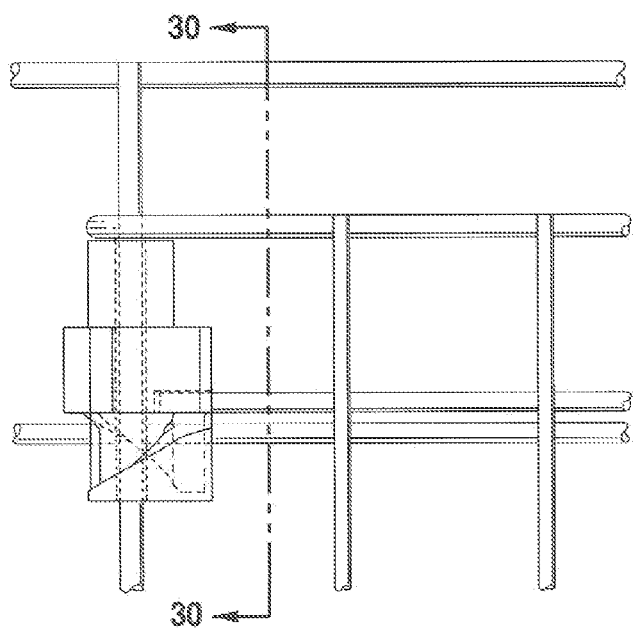
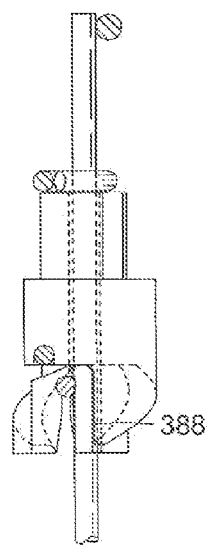
FIG. 29  FIG. 30

DOOR CLOSING MECHANISM

CROSS-REFERENCE TO RELATED APPLICATIONS

The present application claims priority to, and the benefit of, U.S. Provisional Application Ser. No. 62/043,102 entitled "Door Closing Mechanism" filed on Aug. 28, 2014, the disclosure of which is herein incorporated by reference in its entirety.

STATEMENT RE: FEDERALLY SPONSORED RESEARCH/DEVELOPMENT

Not Applicable

BACKGROUND

The present invention relates to a door closing mechanism for a pet crate,

Prior art pet crates have been designed so that the pet crate has an opening through which a pet may enter or exit the pet crate. The opening also has a door that can be traversed to an opened position or a closed position. In the opened position, the door is traversed away from the opening so that the pet can freely enter or exit the pet crate. In the closed position, the door is disposed so as to cover the opening and prevent the pet from entering or exiting the pet crate. Typically, these doors are secured to the closed position with a single lock. Unfortunately, these systems do not reinforce the entire door about its periphery.

Systems have been created in order to reinforce the periphery of the door so that the animal cannot bend an unreinforced portion of the door to escape. Unfortunately, these systems may have certain deficiencies that complicate operation of the door.

Accordingly, there is a need in. the art for an improved door closing mechanism.

BRIEF SUMMARY

The various embodiments disclosed herein address the needs discussed above, discussed below and those that are known in the art.

The various embodiments relate to a vertical wall having a panel and a door. The panel and the door are fabricated from a plurality of interconnected horizontal and vertical wire rods. The horizontal and vertical wire rods of the panel are arranged so as to provide for an opening through which an animal may proceed in order to pass through the panel. The door is hinged to one of the vertical wire rods of the panel and is traversable between a closed position and an opened position. In the opened position, the animal may proceed through the opening of the panel. In the closed position, the door is disposed in front of the opening and covers the opening so that the animal may not proceed through the opening of the panel.

The panel may be secured to the door with a latch. The latch requires the door to be lifted upward when closing or opening the door. The latch may be one of the embodiments (inverted hooks, upright hooks, inverted tabs, upright tabs) described in U.S. patent application Ser. No. 13/045,035 the entire contents of which are expressly incorporated herein by reference. In order to lift the door as the door is rotated from the opened position to the closed position, the door and/or panel may be fitted with a camming member. The camming member has a camming surface which engages one of the horizontal wire rods of the panel or door as the door is traversed from the opened position to the closed position. Alternatively or additionally, the camming member may be part of a camming system comprised of first and second camming members, each having a camming surface which slides against each other as the door is traversed from the opened position to the closed position. In this manner, the handler need not lift the door then rotate the door in order to traverse the door from the opened position to the closed position. Rather, the trainer need only swing the door toward the closed position. The trainer can just push the door closed. The camming member lifts the door upward until the door contacts the panel. At which time, the camming member allows the door to be dropped downward so that the latch may be engaged to reinforce the door in the closed position. In order to keep the door in the closed position, a lock may be engaged to prevent upward traversal of the door. A plurality of latches may be disposed at a plurality of positions around the door to strengthen the door.

More particularly, a vertical wall comprising a panel, a door, a camming member and a latch is discussed. The panel may be lubricated from a plurality of interconnected horizontal and vertical wire rods. The plurality of interconnected horizontal and vertical wire rods may be arranged to form an opening for allowing an animal to pass through the panel. The door may be fabricated from a plurality of interconnected horizontal and vertical wire rods. The door may be pivotally hinged to a first vertical wire rod of the panel and traversable between a closed position and a closed position. The door may be sufficiently large to cover the opening to block the opening and prevent the animal from passing through, the opening of the panel when the door is in the closed position. The animal may be capable of passing through the opening when the door is in the opened position.

The camming member may be attached to a first horizontal wire rod of the door adjacent to the first vertical wire rod of the panel so that a camming surface of the camming member slides against a first horizontal wire rod of the panel or a camming surface of a second camming member attached to the panel as the door is traversed from the opened position to the closed position to lift the door upward. The latch may be mounted to the panel or door which allows the door to be pivoted to the opened or closed position only by lifting the door upward to disengage the latch.

The panel may be one of a plurality of panels that form a pet crate or a play pen for an animal.

The camming member may have first and second mounting, members. The first mounting member may be fixedly attached to the first horizontal wire rod of the door. The second mounting member may be pivotally attached to the first vertical wire rod of the panel.

The second mounting member may have a C shaped slot. The C shaped slot may have an inner cavity that is equal to or larger than an outer diameter of the first vertical wire rod of the panel so that the camming member may be snapped onto the first vertical wire rod of the panel and be pivotally hinged thereto.

The camming member may extend from a portion of the first horizontal wire rod of the door wrapped around the first vertical wire rod of the panel.

The latch may he an inverted hook, upright hook, inverted tab or an upright tab.

The camming surface of the camming member may lift the door upward to at least a point so that the latch clears a horizontal wire rod of the door or panel.

The camming member may be closer to the first vertical wire rod of the panel compared to a free distal end of the door.

The second camming member may he fixedly attached to one of the horizontal wire rods of the panel and the first vertical wire rod of the panel. If a second camming member is utilized, then the camming surfaces of the first and second camming members slide against each other as the door is rotated from the opened position to the closed position.

In another aspect, a vertical wall may have a panel, a door, a camming member and a latch. The panel may be fabricated from a plurality of interconnected horizontal and vertical wire rods. The plurality of interconnected horizontal and vertical wire rods may be arranged to form an opening for allowing an animal to pass through the panel. The door may be fabricated from a plurality of interconnected horizontal and vertical wire rods. The door may be pivotally hinged to a first vertical wire rod of the panel and traversable between a closed position and a closed position. The door may be sufficiently large to cover the opening to block the opening and prevent the animal from passing through the opening of the panel when the door is in the closed position. The animal may be capable of passing through the opening when the door is in the opened position.

A camming member may he attached to the panel so that a first horizontal wire rod of the door slides against a first ramp of the camming member as the door is traversed from the opened position to the closed position to lift the door upward. The latch may be mounted to the panel or door which allows the door to be pivoted to the opened position only by lifting the door upward to disengage the latch.

The camming member may have an inverted ramp attached to the first ramp so that the inverted ramp allows the first, horizontal wire rod of the door to fail downward to engage the latch. The camming member may be disposed closer to a distal end of the door than the first vertical wire rod of the panel.

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 15 is an enlarged view of the camming member when the door is placed parallel to the panel and the door is lifted vertically upward immediately before being traversed downward to the closed position;

FIG. 16 is a side view of the camming member shown in FIG. 15;

FIG. 17 is an enlarged view of the camming member when the door is in the closed position;

FIG. 18 is a side view of the camming member shown in FIG. 17;

FIG. 19 is a perspective view of the pet crate having a. third embodiment of the camming member;

FIG. 20 is an enlarged perspective view of the third embodiment of camming member as the door interacts with the camming member;

FIG. 21 illustrates the door being lifted upward as the door interacts with the ramp of the camming member;

FIG. 22 illustrates the door being traversed to the closed position;

FIG. 27 is a front view of the camming system, door and panel immediately prior to the door being dropped down to the closed position;

FIG. 28 is a side view of the camming system, door and panel shown in FIG. 27;

FIG. 29 is a front view of the camming system, door and panel shown in FIG. 27 when the door is dropped down to the closed position;

FIG. 30 is a side view of the camming system, door panel shown in FIG. 29;

DETAILED DESCRIPTION

Figure 1:
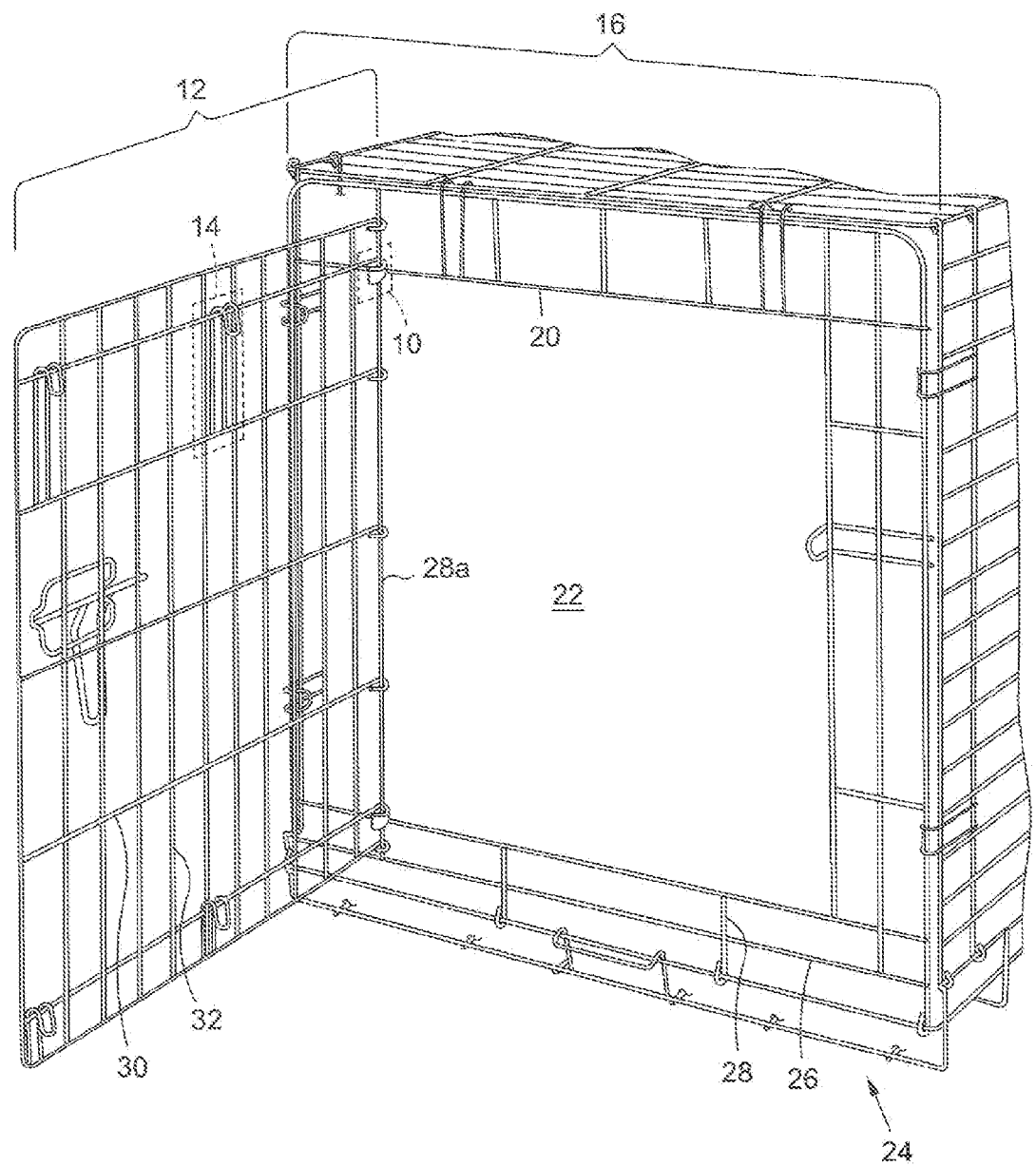
FIG. 1 is a perspective view of a pet crate having a first embodiment of the camming member for lifting a door upward as the door is traversed from an opened position to a closed position.
Figure 6:
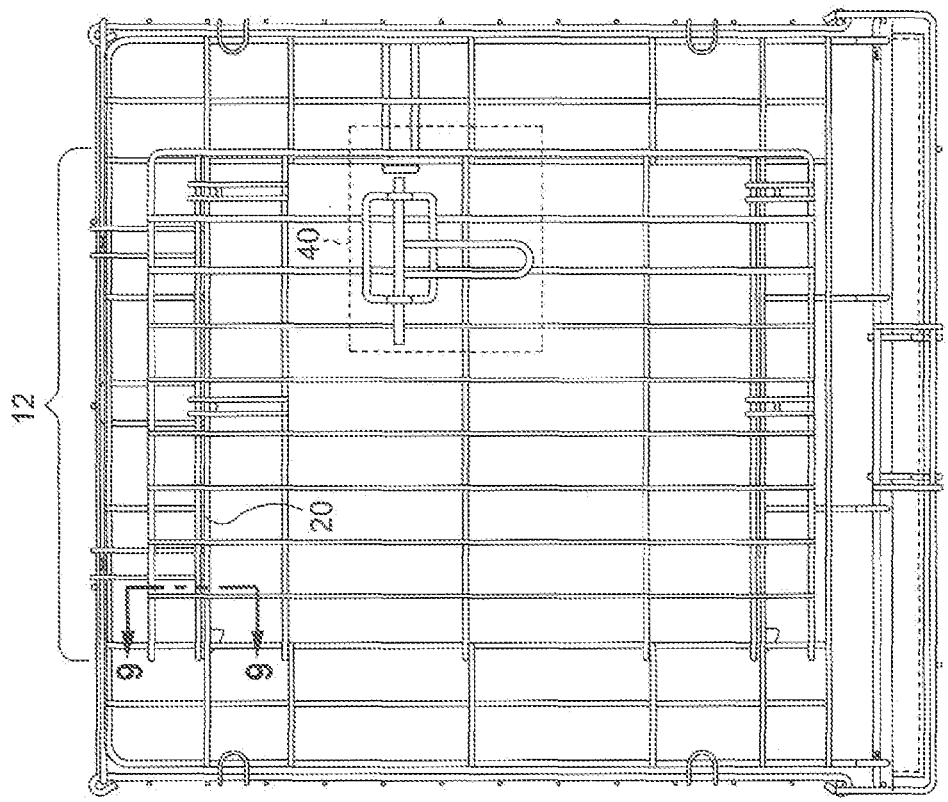
FIG. 6 illustrates the door in the closed position.
Figure 5:
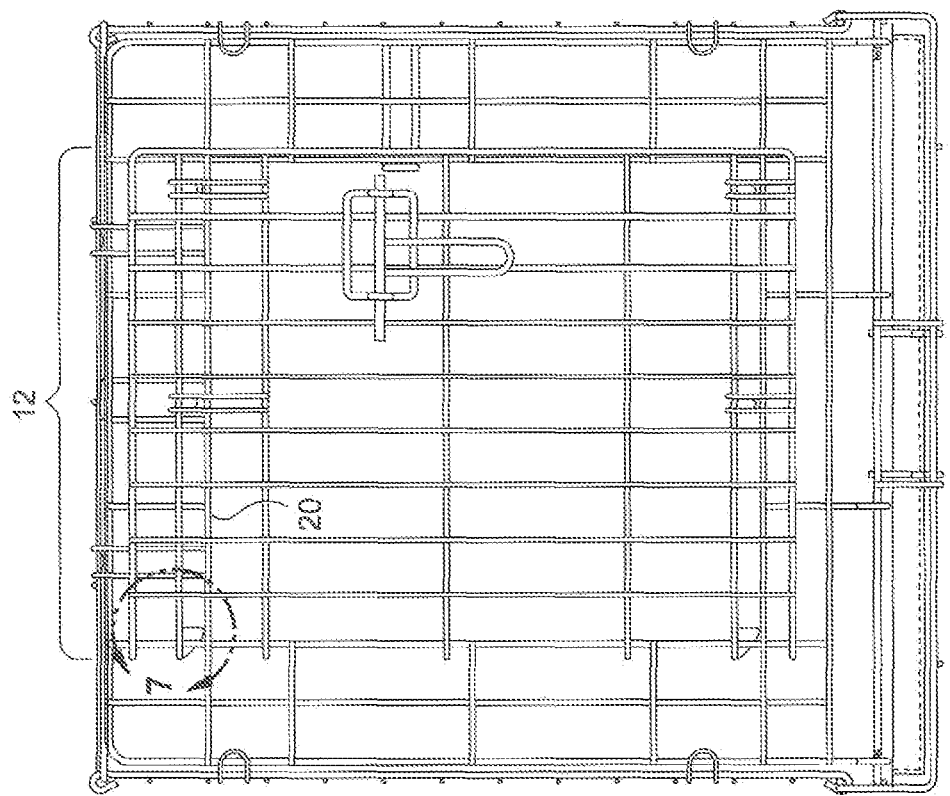
FIG. 5 illustrates the door when being placed against a panel immediately before being traversed downward to the closed position.
Figure 7:
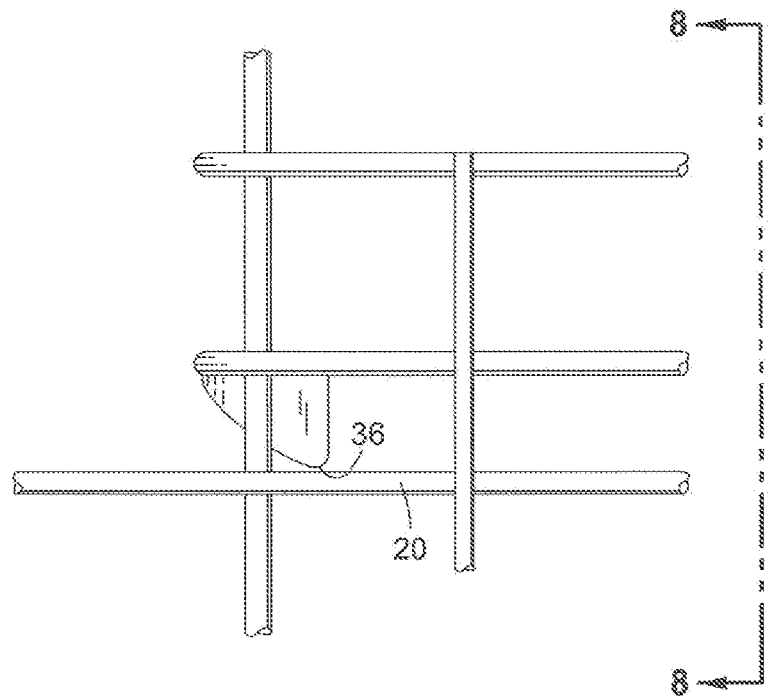
FIG. 7 is an enlarged view of the camming member shown in FIG. 5.
Figure 8:
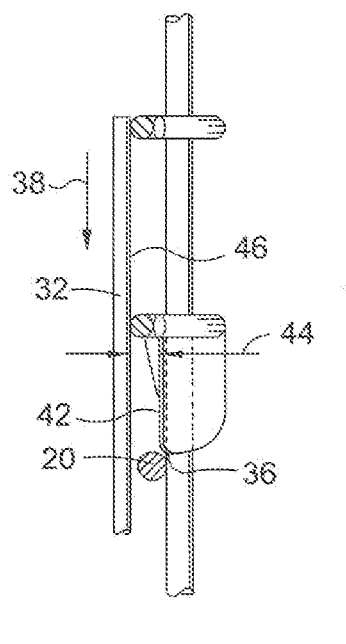
FIG. 8 is a side view of the camming member shown in FIG. 7.
Figure 10:
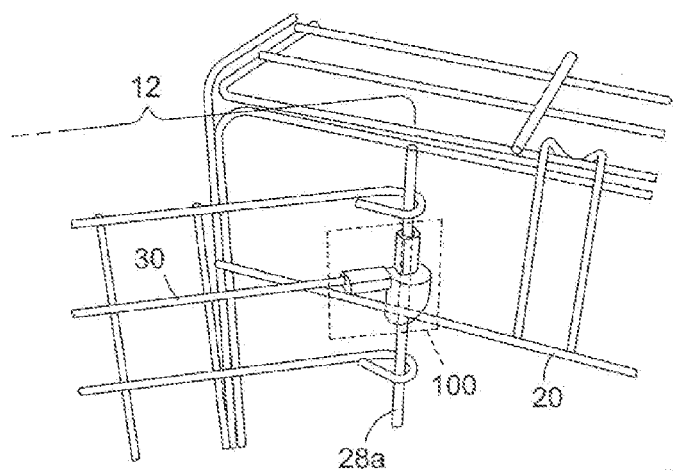
FIG. 10 is an enlarged perspective view of a second embodiment of the camming member.
Figure 11:
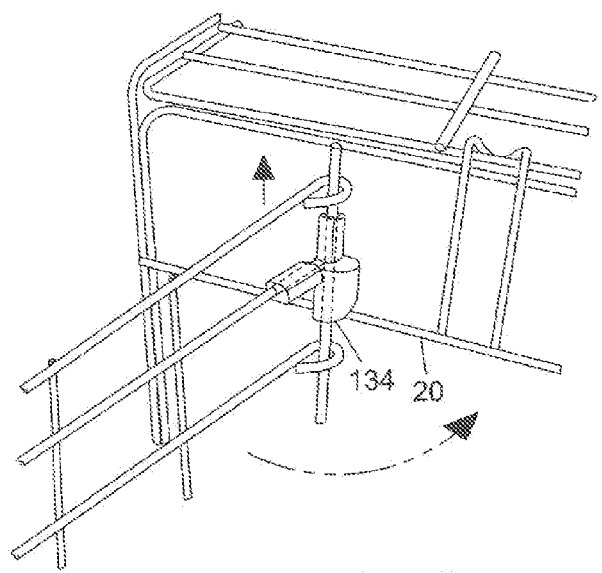
FIG. 11 illustrates the door as it is being traversed to the closed position.
Figure 12:
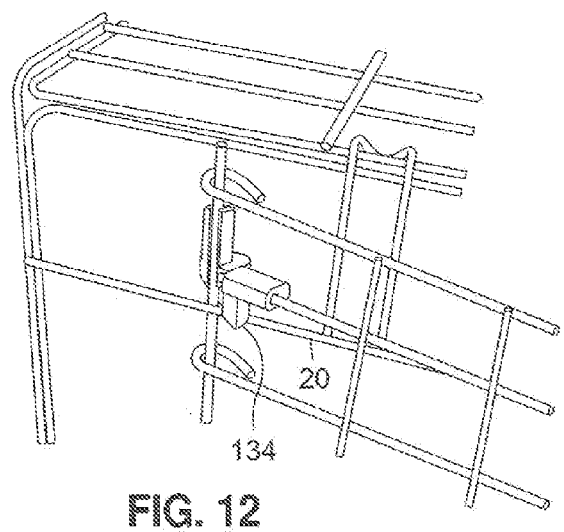
FIG. 12 illustrates the door as it is being further traversed to the closed position.
Figure 13:
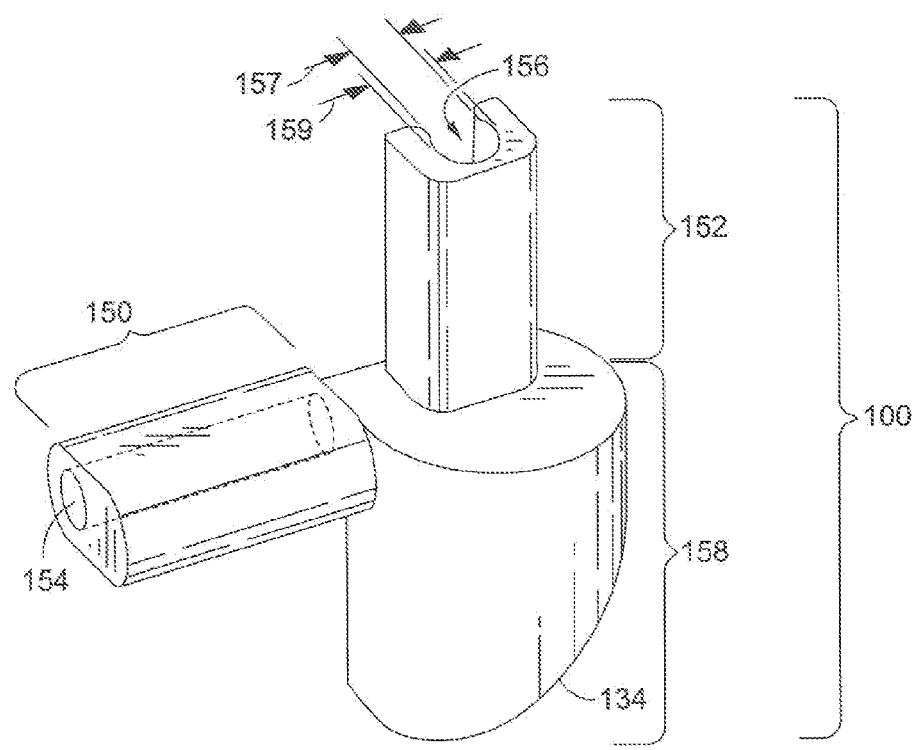
FIG. 13 is an enlarged rear perspective view of the second embodiment of the camming member shown in FIG. 10.
Figure 14:
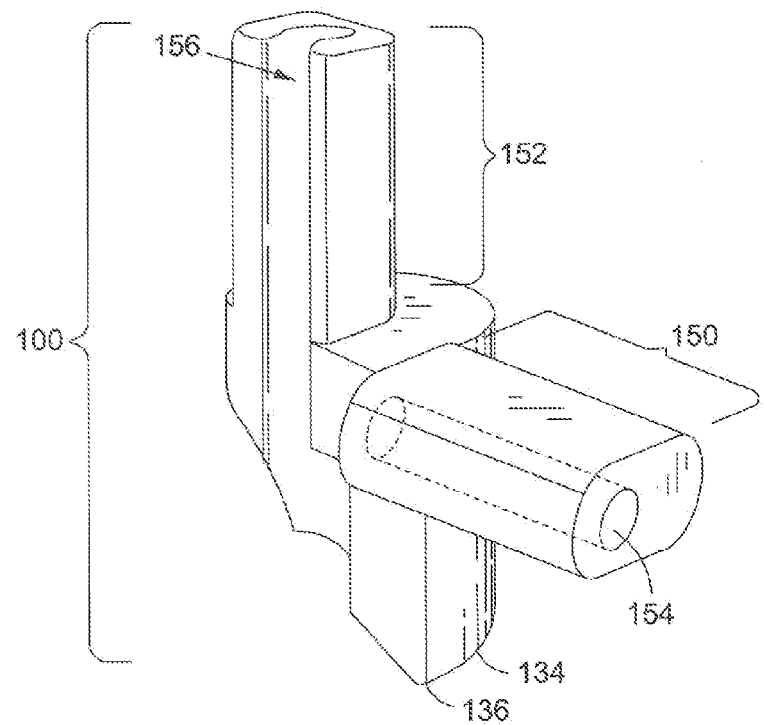
FIG. 14 is an enlarged front perspective view of the second embodiment of the camming member shown in FIG. 10.

Referring now to the drawings, a camming member 10, 100, 200, 300 is shown for lifting the door 12 vertically upward as the door 12 is traversed from an opened position (see FIGS. 1, 10 and 19) to a closed position (see FIGS. 6, 17 and 22). The door 12 must be vertically raised in order to engage a latch 14 that holds the door 12 in the closed position and against the panel 16. The camming member 10, 100, 200, 300 slides against the horizontal wire rod 20 of the panel 16, the horizontal wire rod 18 of the door 12 or a second camming member 304 to lift the door 12 upward so that the latch 14 can be engaged. In this manner, the handler need only push the door 12 to the closed position without lifting the door 12 upward. The camming member 10, 100, 200, 300 is operative to lift the door 12 upward so that the latch 14 may be traversed to the engaged position. This greatly simplifies operation of the latch 14. The handler need not lift the door 12 to close the door 12.

The camming member 10, 100, 200, 300 may be incorporated into a door 12 and a panel 16 having an opening 22 provided for the ingress or egress of an animal through the opening 22. The panel 16 may be one of a plurality of panels that form a pet crate 24 or may be a panel that is wedged between two walls or may be incorporated into a plurality of panels that, form a playpen. The panel 16 and the door 12 may be fabricated from a plurality of horizontal and vertical wire rods 26, 30 and 28, 32. Two or more of the horizontal wire rods 30 of the door 12 may be wrapped around vertical wire rod 28a of the panel 16 so that the door 12 can pivot about the vertical wire rod 28a of the panel 16. The vertical wire rod 28a defines a pivot axis of the door 12.

The latch 14 is shown as being an inverted hook that engages the horizontal wire rod 20 of the panel 16 when the latch 14 is in the engaged position. The latch 14 may also be an upright hook, upright tab or inverted tab as farther described in the U.S. patent application Ser. No. 13/045,035 which was filed on Mar. 10, 2011, the entire contents of which, is expressly incorporated herein by reference. As discussed in U.S. patent application Ser. No. 13/045,035, to engage or disengage the latch 14, the door must he lifted upward so that the latch clears the respective horizontal wire rod of the panel or door. In order to assist in the lifting of the door when traversing the door from the opened, position to the closed position, the camming member 10, 100, 200, 300 may be incorporated into a door 12 and panel 16 having any one of the inverted hooks, upright clips, inverted tabs or upright tabs as described in U.S. patent application Ser. No. 13/045.035. The following discussion of the camming member 10, 100, 200, 300 has been described in relation to the inverted hook configuration of the latch 14 for the purpose of clarity but the other configurations of the latch 14 are also contemplated.

Figure 2:
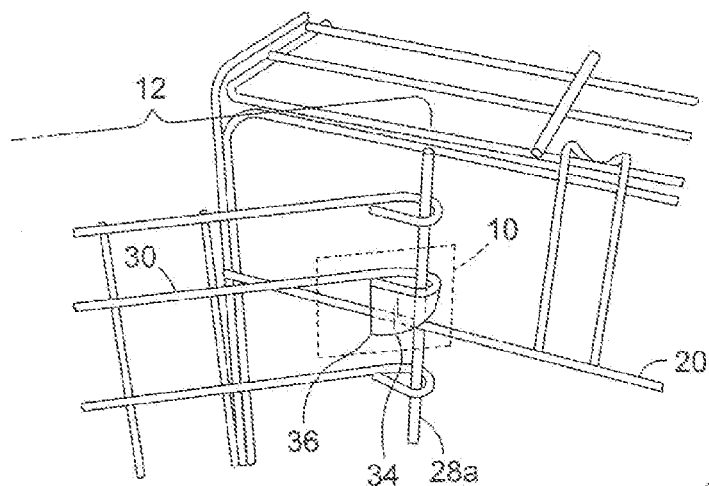
FIG. 2 is an enlarged perspective view of the camming member shown in FIG. 1.
Figure 3:
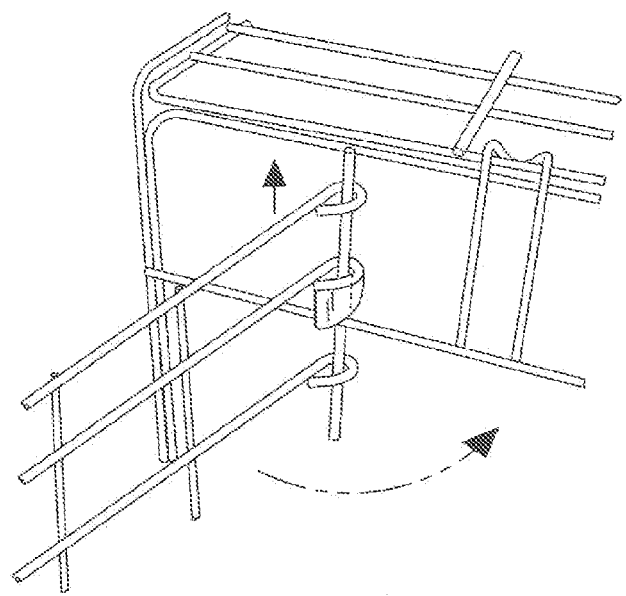
FIG. 3 illustrates the door as it is being traversed to the closed position.
Figure 4:
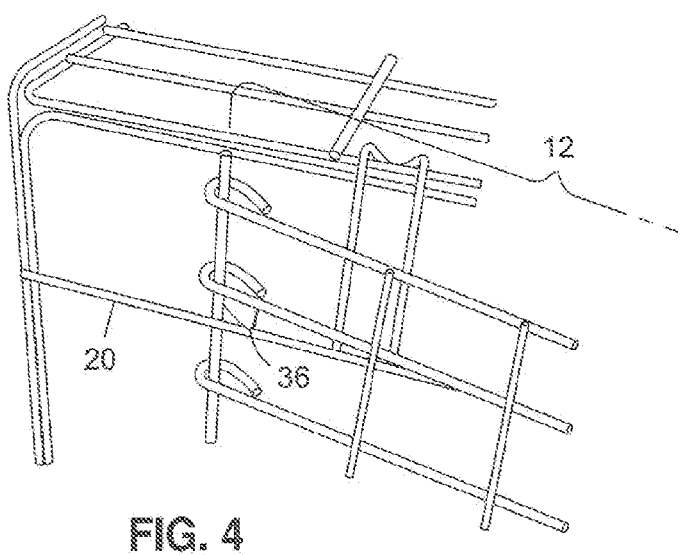
FIG. 4 illustrates the door as it is being further traversed to the closed position.

More particularly, referring now to FIGS. 1-9, the camming member 10 facilitates lift of the door 12 as the door 12 is being rotated from the opened position (see FIG. 2) toward the closed position (see FIGS. 3 and 4). In particular, the camming member 10 may be attached to a portion of the horizontal wire rod 30 wrapped around the vertical wire rod 28a of the panel 16. as shown in FIG. 2, The camming member 10 may be attached to the horizontal wire rod 30 of the door 12 in a manner to extend downward. When the door 12 is in the opened position, the camming member 10 need not contact the horizontal wire rod 20 of the panel 16. When the door 12 is rotated slightly inward, as shown in FIG. 2 the camming member 10 may gradually engage the horizontal wire rod 20 of the panel 16 more and more as shown in the progression illustrated in FIGS. 3 and 4.

The camming member 10 may define a camming surface 34. The camming surface 34 may be defined as a smooth gradually increasing curved surface. It is the camming surface 34 that contacts the horizontal wire rod 20 of the panel 16 in order to lift the door 12 upward as the door 12 is traversed from the opened position to the closed position. The camming surface 34 initially starts out in line with the horizontal wire rod 30. The horizontal wire rod 30 then gradually moves downward on the camming surface 34. In this manner, when the door 12 is wide open, the camming member 10 either does not contact the horizontal, wire rod 20 of the panel 16 or does not lift the door 12 significantly upward.

As the door 12 is rotated toward the closed position, the horizontal wire rod 20 engages the camming surface 34 further so as to lift the door 12 upward. Referring now to FIG. 4, right before the door 12 reaches the closed position, die distal tip 36 of the camming surface 34 contacts the horizontal wire rod 20 with which the camming surface 34 engages. At this point, the latches 14 that, are disposed about the door 12 or panel 16 clear the respective horizontal wire rods 26 of the panel 16 with which the latches 14 will engage.

Figure 9:
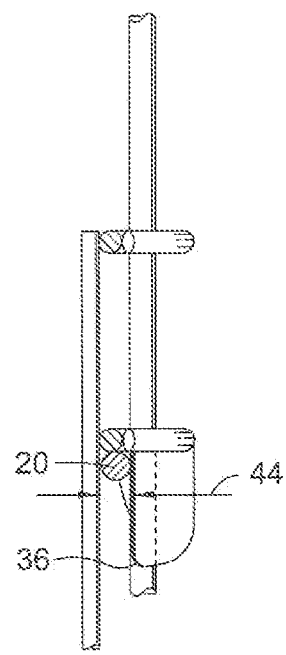
FIG. 9 is a side view of the camming member shown in FIG. 6.

Referring now to FIGS. 5-9, operation of the door 12 as soon as the distal tip 36 of the camming surface 34 passes the horizontal wire rod 20 of the panel is shown. In particular, once the distal tip 36 of the camming surface 34 passes the horizontal wire rod 20, the door 12 is free to fall downward in the direction of arrow 38 (see FIG. 8). Once the door 12 falls downward, the latches 14 are traversed to the engaged position so that the pet behind the door 12 cannot merely push the door 12 open. The pet must lift the door 12 upward then push outwards in order to open the door 12. In order to prevent the pet from lifting and pushing the door 12 open, a lock 40 may be used to prevent further movement of the door 12. The camming surface 34 of the camming member 10 has a vertical surface 42 (see FIG. 8) after the distal tip 36. A gap 44 exist between the vertical surface 42 of the camming member 10 and a rear surface 46 of the vertical wire rod 32 of the door 12. After the distal tip 36 passes the horizontal wire rod 20, the horizontal, wire rod is received into the gap 44, as shown in FIG. 9 to allow the door 12 to move downward so that the latches 14 may be traversed to the engaged position.

The camming member 10 may be attached, to the portion of the horizontal, wire rod 30 that is wrapped around the vertical wire rod 28a of the panel 16 by various means known in the art. By way of example and not limitation, the camming member 10 may be welded, to the portion of the horizontal wire rod 30 that is wrapped around the vertical wire rod 28a of the panel 16.

Referring now to FIGS. 10-18, a second embodiment of the camming member 100 is shown. The camming member 100 may be attached to the horizontal wire rod 30 of the door 12 and the vertical wire rod 28a of the panel 16. In particular, the camming member 100 may have first and second mounting members 150, 152 (see FIG. 13). The first mounting member 150 may extend horizontally outward and have an aperture 154 that is sized and configured to receive the horizontal wire rod 30 of the door 12. In the embodiment shown in FIGS. 1-9, each of the horizontal wire rods 30 of the door 12 has a portion that is wrapped around the vertical wire rod 28a of the panel 16. However, in this second embodiment of the camming member 100, the horizontal wire rod 30 that engages the camming member 100 is not wrapped around the vertical wire rod 28. Instead, the horizontal wire rod 30 protrudes straight, into the aperture 154 of the first mounting member 150. The horizontal wire rod 30 of the door 12 may be retained within the aperture 154 by way of a friction fit therebetween or with an adhesive or other welding procedure. The second mounting member 152 is perpendicular to the first mounting member 150. Moreover, the second mounting member 152 may have a C-channel slot 156 that extends vertically upward. The slot 156 receives the vertical wire rod 28a of the panel 16. In particular, the slot 156 may have an entrance defining a width 157 which, is smaller than, an outer diameter of the wire rod 28a. The slot 156 may have an inner diameter 159 which is equal to or slightly larger (e.g., 0.001 to 0.10 inch) greater than an outer diameter of the wire rod 28a. In this way, the second mounting member 152 may be snapped over the vertical wire rod 28a. Also, the vertical wire rod 28a rotates within the slot 156 as the door is being rotated between closed and opened positions.

The camming member 100 may also have a camming section 158. The camming section 158 may also have a camming surface 134. The camming surface 34 may be defined as a smooth gradually increasing curved surface. As the door 12 Is rotated from the opened position (see FIG. 10) to the closed position (see FIGS. 12, 17 and 18), the camming surface 134 engages the horizontal wire rod 20 of the panel 16. As the door 12 approaches the panel 16, the horizontal wire rod 20 of the panel 16 rides on a distal tip 136 of the camming surface 134. At this point the door 12 is lifted as high as it will, go with the camming member 100 and the latches 14 are in position to be traversed to the engaged position. The camming member 100 may be fabricated from, a hard plastic material through injection molding or 3-D printing.

Referring now to FIGS. 15-18. once the horizontal wire rod 20 passes a distal tip 136 of the camming surface 134, the door 12 is allowed to fall downward in the direction of arrow 160 until the door 12 is in the closed position and the latches 14 are in the engaged position. After the distal tip 136 of the camming surface 134, the camming section 158 has a vertical surface 142 that defines a gap 144 between the vertical surface 142 of the camming section 134 and a rear surface 46 of the vertical wire rod 32. The horizontal wire rod 20 is received, into the gap 144 as shown, in FIGS. 17 and 18.

Referring now to FIGS. 19-22, the third embodiment of the camming member 200 is shown. The camming member 200 may be fixed to the panel 16. In FIG. 19, the camming member 200 is shown as being fixed to a lower portion, of the panel 16. The camming member 200 may be fabricated from a wire rod and be welded to the wire rods of the panel. The camming member 200 may be disposed anywhere about the opening 22 in the panel 16. Preferably, the camming member 200 is disposed at the opposite side of the pivot axis of the door 12. The camming member 200 slides against a horizontal wire rod 18 of the door 12 so as to lift the door 12 upward as the door 12 is pivoted from the opened position to the closed position so that the latches 14 may be traversed to the engaged position as shown FIG. 22.

When the door 12 is in the opened position, the door 12 is not lifted upward, as shown in FIGS. 19 and 20. When the door 12 is traversed toward the closed position, or toward the panel 16 by rotating the door 12 about its pivot axis, the horizontal wire red 18 of the door 12 engages a ramp 262 of the camming member 200. As the door 12 moves closer to the panel 16, the door 12 moves upward in the direction of arrow 260, as shown in FIG. 21. At this point, the latch 14 is in position to be traversed to the engaged position as shown in FIG. 22. As the door 12 moves closer to the panel 16, the ramp section 262 is connected to an inverted ramp 264 that allows the door 12 to move downward in direction of arrow 266 at which point the latches 14 are in the engaged position. The door 12 is now in the closed position.

Referring now to FIGS. 23-30, a fourth embodiment of a camming system 300 is shown. The camming system 300 is shown as being attached at one point on vertical wire rod 28a. However, it is also contemplated that the camming system 300 may be disposed at two or more locations on the vertical wire rod. The camming system 300 comprises a first camming member 302 fixedly attached to the door 12 and a second camming member 304 fixedly attached to the panel 16. Each of the first and second camming members 302, 304 has a camming surface. 334a, b which slide and mate with each other during rotation of the door 12 about the vertical wire rod 28a in order to smoothly lift the door 12 from, a lower position (see FIG. 24) to an elevated position (see FIGS. 26-28) then back down to a lowered position (see FIGS. 29-30) to engage the latch 14 disposed at one or more locations about the periphery of the door 12 and/or periphery of the opening 22 formed in the panel 16.

The first camming member 302 may have two different slots 366a, b, as shown in FIGS. 23 and 32-34. The slot 366a receives the vertical wire rod 28a of the panel 16. The slot 366b receives the horizontal wire rod 30 of the door 12. As the door 12 rotates about the vertical wire rod 28a of panel 16, the first camming member 302 rotates in sync with the door 12. The slot 366a may have an entrance having a width 368 which is greater than an outer diameter of the wire rod 28a. The slot 366a may converge to a choke point having a width 370 that is smaller than the outer diameter of the wire rod 28a. The slot 366a may have a cylindrical cavity having an inner diameter 372 (See FIGS. 23 and 34) which is greater than the outer diameter of the vertical wire rod 28a. In this manner, the first camming member 302 may be slid over the vertical wire rod 28a and snapped thereover so that the first camming member 302 can rotate about the vertical wire rod 28a. The other slot 366b may be sized and configured to loosely fit the horizontal wire rod 30 of the door 12. In this regard, the slot 366b may have an entrance that does not narrow down to a choke point as in the slot 366a. The first camming member 302 may be lifted up and down to remove the horizontal wire rod 30 of the door 12 or reinsert the horizontal wire rod 30 of the door 12 back into the slot 366b. The slots 366a, b may be oriented perpendicular to each other for receiving the vertical wire rod 28a and the horizontal wire rod 30 the door 12.

In order to hold the first camming member 302 in position so that the horizontal wire rod 30 of the door 12 is maintained within the slot 366b, a spacer 374 may be disposed on the vertical wire rod 28a and snapped between the first caroming member 302 and a horizontal wire rod 30 of the door 12, as shown in FIG. 27. The spacer 374 may have an entrance that narrows down to a choke point similar to the slot 366a so that the spacer 374 may be snapped, over the vertical wire rod 28a and rotatably secured thereto. Preferably, a height 376 of the spacer 374 is sized so that the spacer 374 pushes the first camming member 302 so that the slot 366b is pushed over or maintained over the horizontal wire rod 30 of the door 12. Alternatively or in addition to the spacer 374, the first camming member 302 may be held in place by configuring the slot 366b in a similar fashion to the slot 366a so that the slot 366b snaps over the horizontal wire rod 30 of the door 12.

Figure 23:
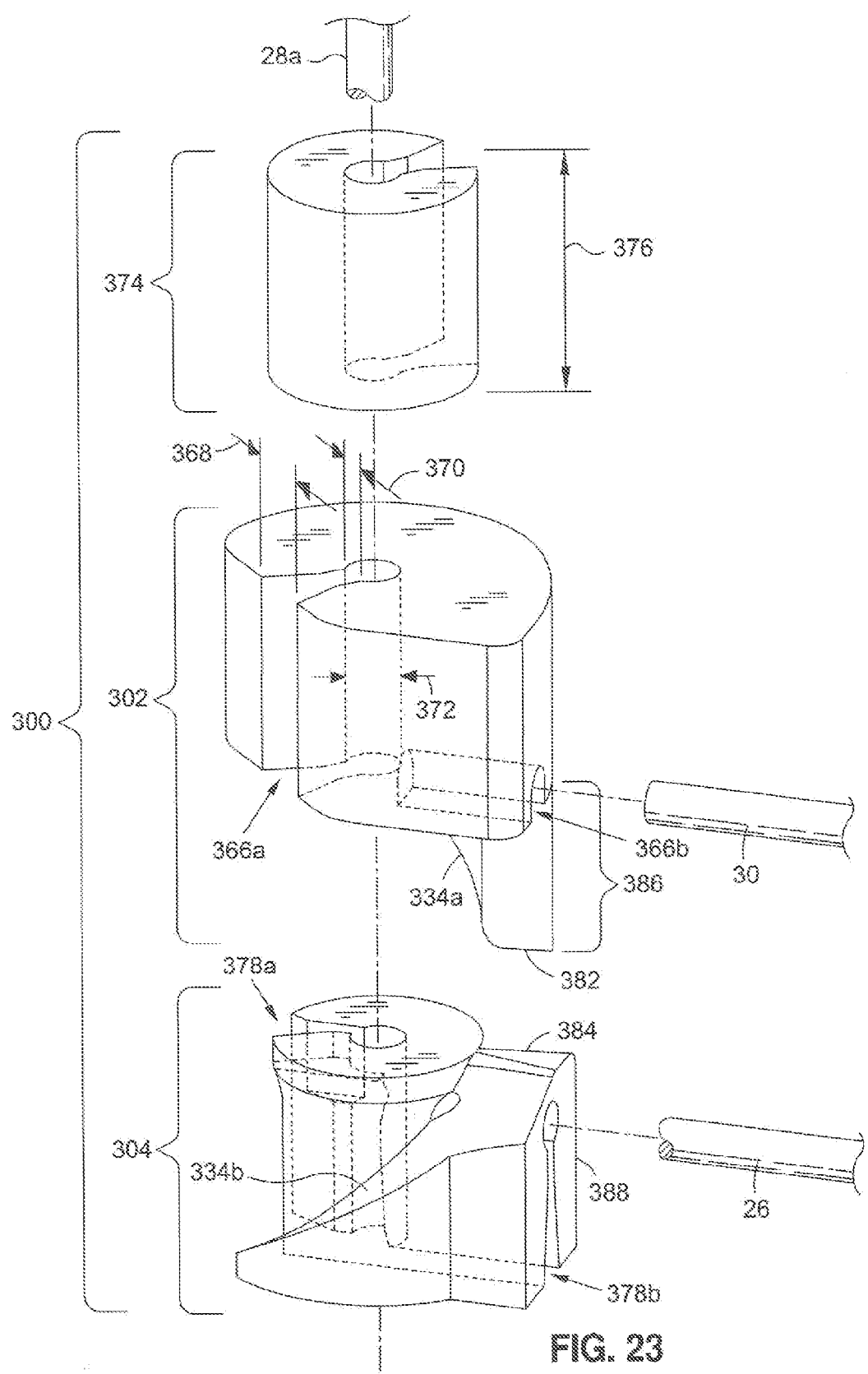
FIG. 23 is ah exploded perspective view of a fourth embodiment of a camming system.
Figure 24:
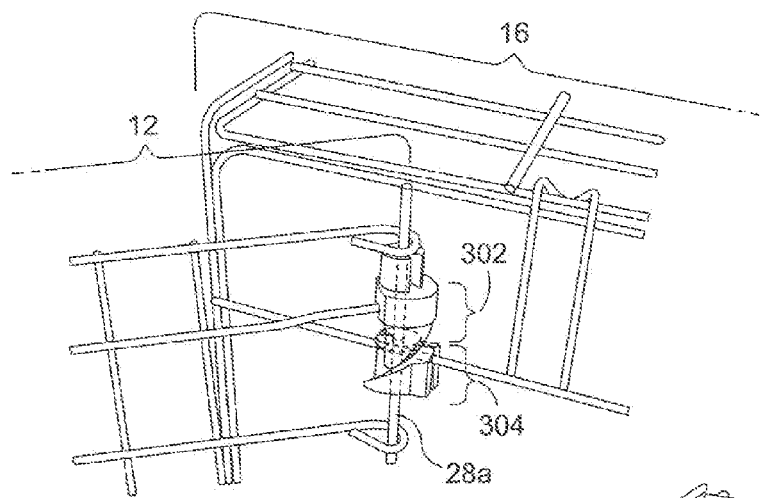
FIG. 24 is a perspective view of the camming system shown in FIG. 23 mounted to a door and panel with the door in an opened position.
Figure 25:
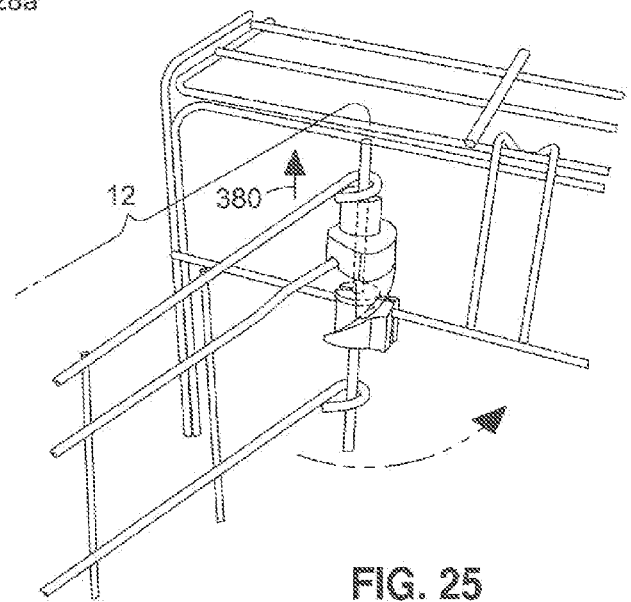
FIG. 25 is a perspective view of the camming system, door and panel shown in FIG. 24 as the door is being traversed to the closed position.
Figure 26:
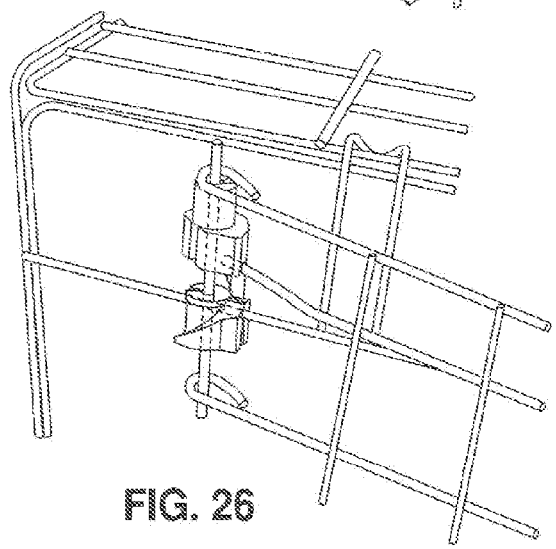
FIG. 26 is a perspective view of the camming system, door and panel shown, in FIG. 25 as the door is being further traversed to the closed position.
Figures 32, 33:
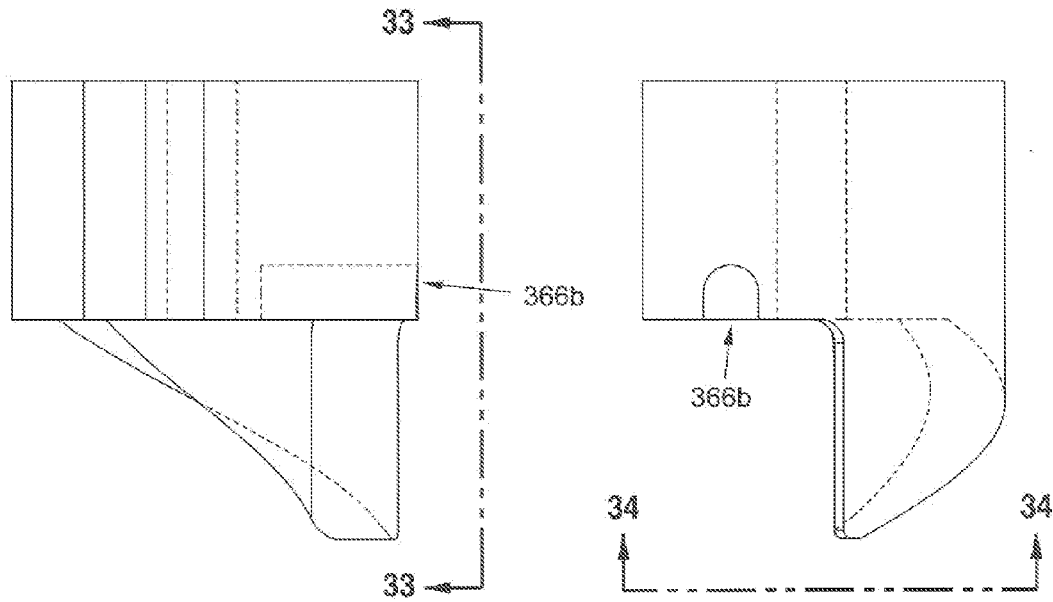
FIG. 32 Is a front view of the first camming member shown in FIG. 31.
FIG. 33 is a side -view of the first camming member shown in FIG. 32.
Figures 31, 34:
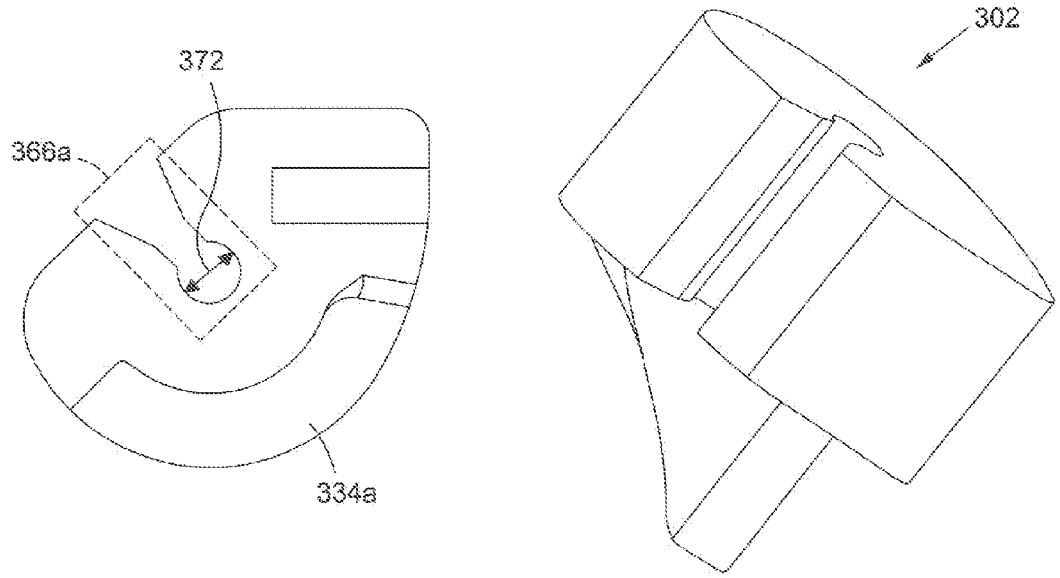
FIG. 31 is a perspective view of the first camming member.
FIG. 34 is a bottom view of the first camming member shown in FIG. 33.
Figure 38:
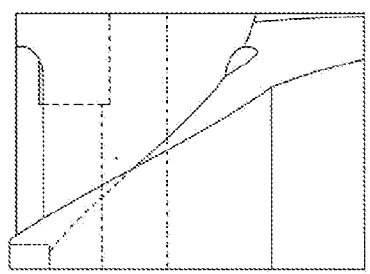
FIG. 38 is a left side view of the second camming member shown in FIG. 36.
Figure 36:
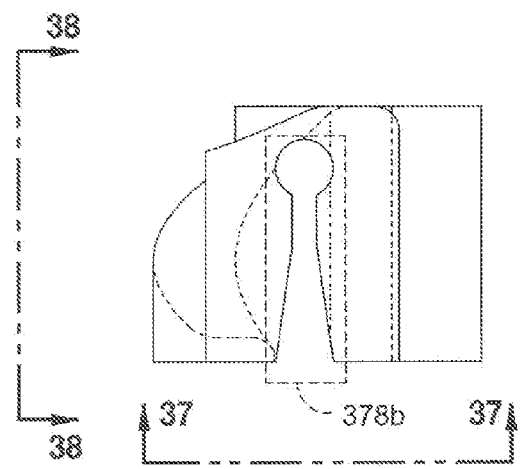
FIG. 36 is a ride side view of the second camming member shown in FIG. 35.
Figure 37:
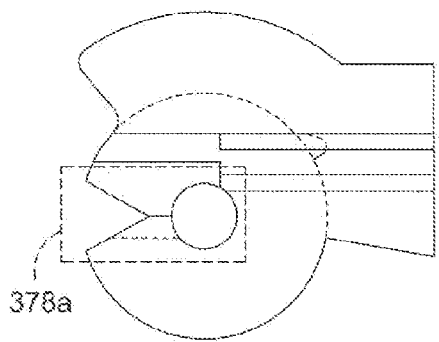
FIG. 37 is a bottom view of the second camming member shown in FIG. 36.
Figure 35:
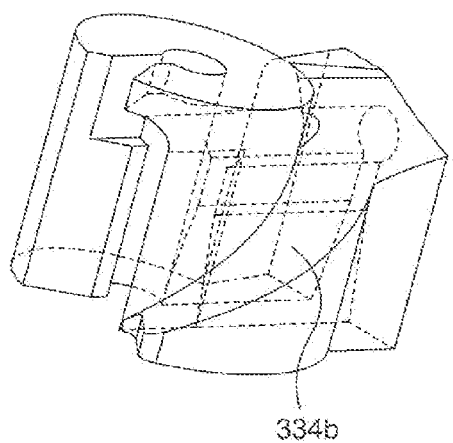
FIG. 35 is a perspective view of the second camming member.

The horizontal wire rods 30 may extend and be wrapped around the vertical wire rod 28a so that the door 12 can be rotated about the vertical wire rod 28a. The horizontal wire rod 30 of the door 12 that is received into the slot 366b does not wrap around the vertical wire rod 28a. Rather, the horizontal wire rod 30 may be received into the slot 366b and terminate there within. In FIG. 23, the horizontal wire rod 30 is being shown as being truncated to terminate within the slot 366b.

The second camming member 304 may be fixedly attached to the panel 16. The second camming member 304 may also have two slots 378a, b. (see FIGS. 23 and 35-38). The slots 378a, b may be oriented perpendicular to each other for receiving the vertical wire rod 28a and the horizontal wire rod 26 of the panel 16. The slot 378a may have an entrance that starts out wider than the outer diameter of the vertical wire rod 28 but chokes to a point that is narrower than the vertical wire rod 28a. The slot 378a may have a cylindrical inner cavity that receives the vertical wire rod 28a and has an inner diameter that is greater than the outer diameter of the vertical wire rod 28a. In this manner, the second camming member 304 may be slid over the vertical wire rod 28a and snap onto the vertical wire rod 28a in order to retain the second camming member 304 to the vertical wire rod 28a. Additionally, the other slot 378b of the second camming member 304 may have a similar configuration to the slot 378a in that the slot 378b has an entrance that starts out wider than an. outer diameter of the horizontal wire rod 26 of the panel 16 but narrows down to a choke point that is narrower than the outer diameter of the horizontal wire rod 26 of the panel 16. The slot 378b has an inner cavity that ultimately receives the horizontal wire rod 26 of the panel 16. This configuration allows the slot 378b to snap over the horizontal wire rod 26 of the panel 16. Additionally, the horizontal wire rod 26 of the panel may extend through the second camming member 304.

The first camming member 302 imposes a downward force on. the second camming member 304. As such, the second camming member 304 does not require a spacer 374 as is utilized to hold the first camming member 302 in position with respect to the door 12.

The camming surfaces 334a, b may contact each other so that the camming surfaces 334a, b slide against each other during rotation of the door. The first and second camming members 302, 304 may be fabricated, from a material that has a low coefficient of friction in order to facilitate rotational movement of the door 12 about the vertical wire rod 28a and lifting of the door 12. The camming surfaces 334a, b may also be coated or embedded with an anti-friction material to further facilitate rotational movement of the door 12 about vertical wire rod 28a. The camming surfaces 334a, b may comprise a complex compound curved that mates with each other throughout the entire rotation of the door 12 except when the door 12 is in the closed position and dropped down to the lowered position. The width of the camming surface 334a may be equal to the width of the camming surface 334b. Moreover, at least half of the width of the camming surface 334a may be in sliding contact with the width When the door 12 is rotated from the opened position (see FIG. 24) to the closed position, (see FIGS. 29 and 30), the camming surfaces 334a, b slide against each other in order to lift the door 12 upward in the direction of arrow 380 due to the curved configuration of the camming surfaces 334a, b. As the door 12 approaches the panel 16, a distal tip 382 of the first camming member 302 slides against the camming surface 334b of the second camming member 304. The distal tip 382 of the first camming member 302 continues to slide against the camming surface 334b of the second camming member 304 until the distal tip 382 reaches an end 384 of the camming surface 334b of the first camming member 304. This position is also shown in FIGS. 27 and 28. When the door 12 is rotated further, the distal tip 382 falls over the end 384 of the camming surface 334b to bring the door 12 downward so that the latch 14 may be engaged. A downward protruding portion 386 of the first camming member 302 is now disposed behind the vertical wall 388 of the second camming member 304 to prevent the door 12 from rotating back to the opened position. Moreover, the latch 14 prevents the door 12 from rotating back to the opened position. In order to rotate the door 12 back to the opened position, the door 12 must be lifted vertically upward in order to disengage the latch(es) 14.

Each of the systems 10, 100, 200 and 300 described herein may be utilized alone or in combination with, each other.

The above description is given by way of example, and not limitation. Given the above disclosure, one skilled in the art could devise variations that are within the scope and spirit of the invention disclosed herein, including various ways of mounting or attaching the camming members 10, 100, 200. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A vertical wall comprising:
a panel fabricated from a plurality of interconnected horizontal and vertical wire rods, the plurality of interconnected horizontal and vertical wire rods arranged to form an opening for allowing an animal to pass through the panel;
a door fabricated from a plurality of interconnected horizontal and vertical wire rods, the door being pivotally hinged to a first vertical wire rod of the panel and traversable between a closed position and a closed position, the door being sufficiently large to cover the opening to block the opening and prevent the animal from passing through the opening of the panel when the door is in the closed position, and the animal being capable of passing through the opening when the door is in the opened position;
a first camming member of a first horizontal wire rod of the door disposed adjacent to the first vertical wire rod of the panel so that a camming surface of the first camming member slides against a camming surface of a second camming member of the panel as the door is traversed from the opened position to the closed position to lift the door upward;
a latch mounted to the panel or door which is traversable from a disengaged position to an engaged position when the door is lifted upward by the first and second camming members to clear the latch.

2. The vertical wall of the claim 1 wherein the panel is one of a plurality of panels that form a pet crate or a play pen for an animal.

3. The vertical wall of claim 1 wherein the first calming member has first and second mounting members, the first mounting member fixedly attached to the first horizontal Wire rod of the door, the second mounting member pivotally attached to the first vertical wire rod of the panel.

4. The vertical wall of claim 3 wherein the second mounting member has a C shaped slot, the C shaped slot having an inner cavity that is equal to or larger than an outer diameter of the first vertical wire rod of the panel so that the first camming member is pivotally hinged to the first vertical wire rod of the panel.

5. The vertical wall of claim 1 wherein the first camming member extends from a portion of the first horizontal wire rod of the door wrapped around the first vertical wire rod of the panel.

6. The vertical wall of claim 1 wherein the latch is an inverted hook, upright hook, inverted tab or an upright tab.

7. The vertical wall of claim 1 wherein the camming surface of the first camming member lifts the door upward to at least a point so that the latch clears a horizontal wire rod of the door or panel.

8. The vertical wail of claim 1 wherein the first camming member is closer to the first vertical wire rod of the panel compared to a free distal end of the door.

9. The vertical wall of claim 1 wherein the second camming member is fixedly attached to one of the horizontal wire rods of the panel and the first vertical wire rod of the panel.

10. The vertical wall of claim 1 wherein camming surfaces of the first and second camming members slide against each other as the door is rotated from the opened position to the closed position.

11. The vertical wall of claim 1 wherein the second camming member is a horizontal wire rod of the panel.

* * * * *